March 8, 1960  A. W. PRATT  2,928,007
CIRCUIT FOR CONNECTING ALTERNATORS IN PARALLEL
Filed April 16, 1958  2 Sheets-Sheet 1
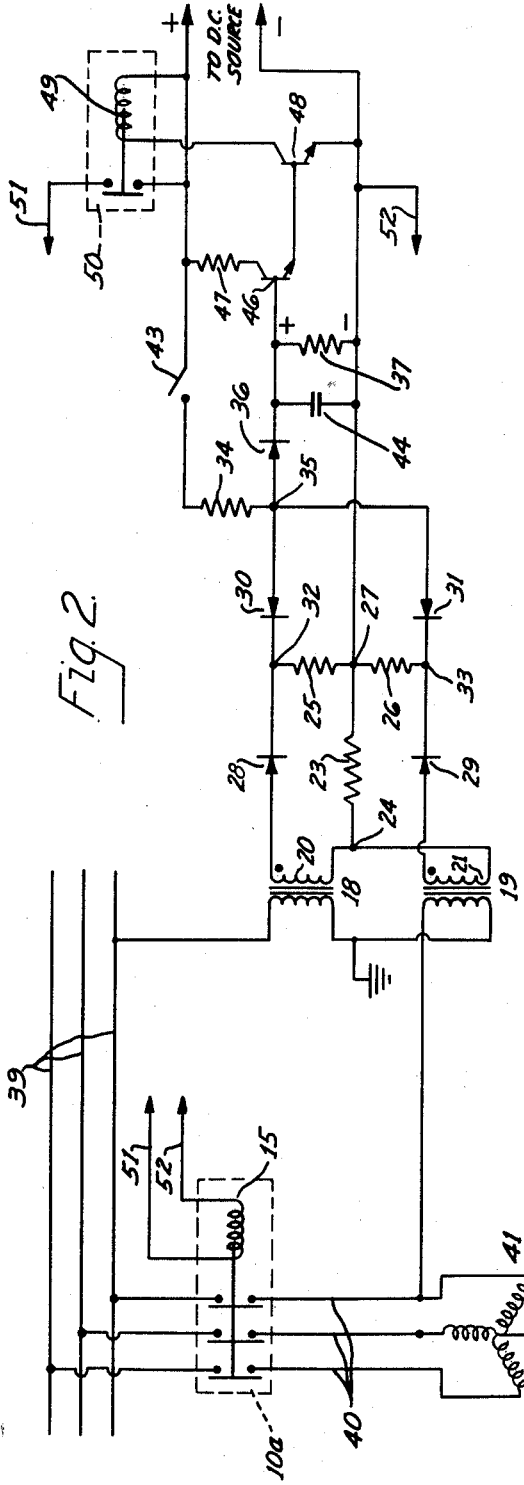
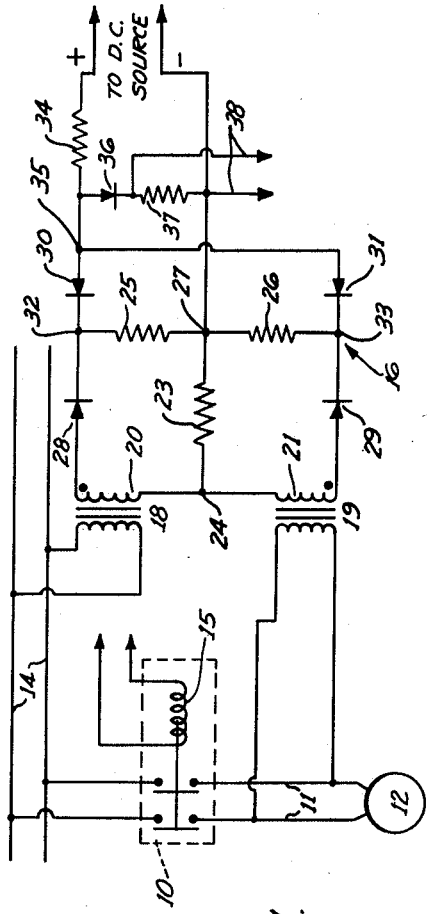
INVENTOR.
ALOYSIUS W. PRATT
BY
ATTORNEYS.

March 8, 1960 A. W. PRATT 2,928,007
CIRCUIT FOR CONNECTING ALTERNATORS IN PARALLEL
Filed April 16, 1958 2 Sheets-Sheet 2

INVENTOR.
ALOYSIUS W. PRATT
BY
ATTORNEYS.

United States Patent Office 2,928,007
Patented Mar. 8, 1960

2,928,007

CIRCUIT FOR CONNECTING ALTERNATORS IN PARALLEL

Aloysius W. Pratt, Cleveland Heights, Ohio, assignor to Jack & Heintz, Inc., Cleveland, Ohio, a corporation of Delaware Application April 16, 1958, Serial No. 728,965

10 Claims. (Cl. 307—87)

This invention relates to a circuit for automatically connecting alternators in parallel and more particularly to a circuit for controlling a relay to make a connection between an alternator and another alternating current circuit connected to a different source, the connection automatically being made only when the alternator is so nearly in phase with the system to which it is to be connected and is generating a voltage so close in amplitude and frequency to the voltage of the system that the connection can be made with safety and without risk of unduly large transient effects. The circuit is particularly adapted for use in alternating current systems of multi-engined aircraft, but it is to be understood that it may also be employed in different systems and environments.

A general object of the invention is to provide an improved automatic paralleling circuit in which the sensing function is performed without the use of conventional relays. Another object is to provide an automatic paralleling circuit in which sensitive and reliable static components, i.e., components having no moving parts, are utilized to provide a signal voltage of sufficient magnitude to trip a paralleling relay when the instantaneous values of two alternating voltages have been close enough to equality for a sufficient length of time to indicate that the voltages are substantially synchronized. A further object is to provide an automatic paralleling circuit in which the effects of temperature changes and voltage fluctuations are minimized. Another object is the provision of an automatic paralleling circuit of great reliability and light weight. A still further object is the provision of an automatic paralleling circuit that can be adapted to a wide range of design requirements and performance specifications, all with the use of well known and reliable components.

Further objects and advantages of the invention will become apparent from the following description of preferred embodiments thereof, reference being made to the accompanying drawings, in which:

Figure 1 is a simplified diagram showing the basic elements of an automatic paralleling circuit constructed in accordance with the present invention.

Figure 2 is a schematic diagram showing a practical circuit for connecting a three phase alternator to another three phase supply.

Figure 3:
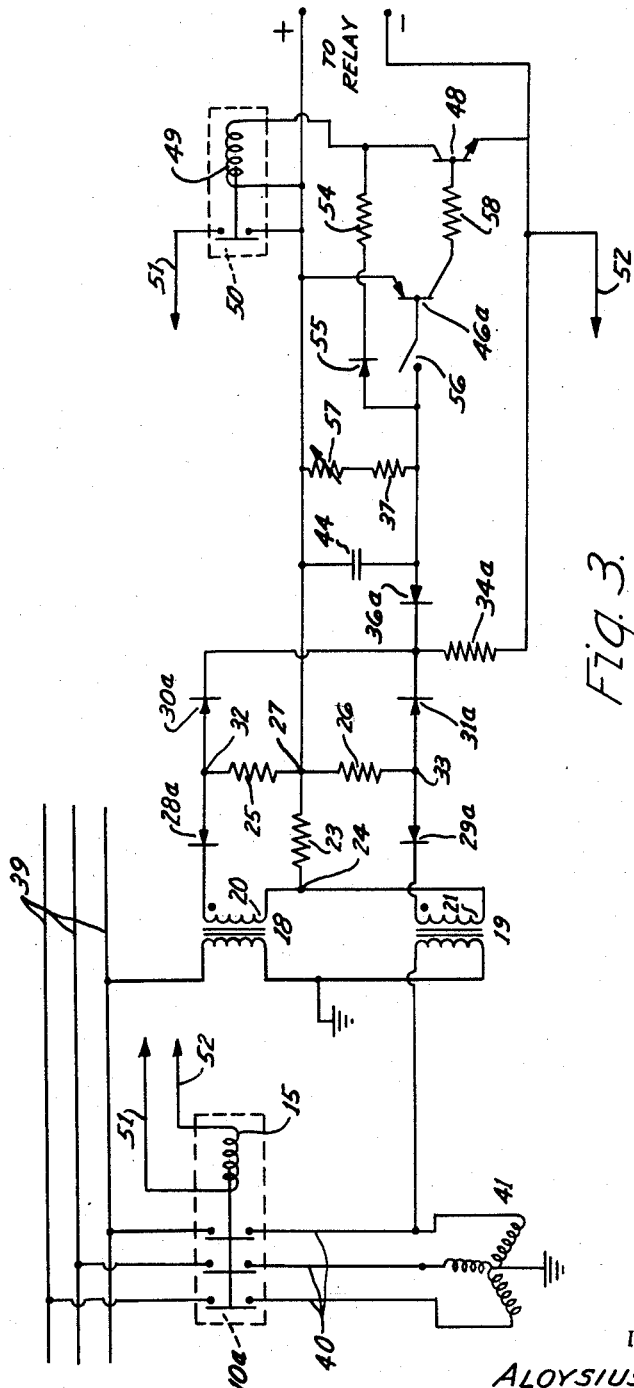
Figure 3 is a diagram showing a modified form of circuit for connecting a three phase alternator to another three phase supply, in which a self-latching circuit is provided.

Briefly, a preferred form of my circuit embodies what may be called a rectifier bridge in which the two A.C. voltages that are to be compared are connected to one side of the bridge and a D.C. control voltage is connected to the other side of the bridge. A rectifier and a load resistor are connected across the D.C. circuit outside of the bridge, and the arrangement is such that the bridge provides a relatively low resistance path for the D.C. whenever the A.C. voltages on the other side of the bridge are not equal, so that there is very little voltage drop across the load resistor. However, when the voltages on the A.C. side of the bridge are instantaneously substantially equal, the rectifiers in the D.C. side of the bridge block, so that the voltage drop across the load resistor immediately becomes substantial; this voltage drop is utilized to control or actuate the paralleling relay.

A system embodying the basic principles of the invention is shown in Figure 1. In this figure a main contactor indicated in general at 10 is arranged to connect conductors 11, which carry the output of alternator 12, to conductors 14, which are energized by another A.C. source. The circuit functions to energize the coil 15 of the contactor 10 only when the voltages in conductors 11 and 14 are sufficiently close to equality in amplitude and in phase to permit the relay to be closed without danger to the system. This is accomplished through the bridge circuit indicated in general at 16. Alternating voltages corresponding in frequency and voltage to the frequency and voltage of the conductors 14 and the frequency and voltage of alternator 12 are supplied to the bridge by means of input transformers 18 and 19, respectively, the primaries of these transformers being connected across the conductors 14 and 11, respectively, while the secondaries 20 and 21 of the transformers are connected in the bridge circuit and thus constitute sources of A.C. in the bridge circuit that correspond in phase frequency and voltage to the A.C. voltages that must be compared in order to determine when it is safe to close the relay 10 and connect the alternator 12 to the conductors 14.

The secondaries 20 and 21 are connected in series in the circuit as shown, with the voltages of the secondaries opposed to each other when the voltages are in phase. A resistor 23 is connected to the point 24 where the secondaries 20 and 21 are connected to each other. A pair of identical resistors 25 and 26 are connected to the other end of resistor 23 at point 27. The ends of resistors 25 and 26 are connected to the outer ends of secondaries 20 and 21; and rectifiers 28 and 29, which are preferably solid state devices such as silicon or germanium rectifiers, are connected in series with the secondaries 20 and 21, respectively.

The D.C. side of the bridge is constituted by rectifiers 30 and 31, which are also connected to the outer ends of resistors 25 and 26 at points 32 and 33. D.C. is supplied to the bridge from an appropriate source through a voltage dropping resistor 34 to point 35 which is connected to both rectifiers 30 and 31. The function of resistor 34, as explained in greater detail below, is to absorb a major portion of the D.C. voltage whenever either rectifier 30 or rectifier 31 conducts. The other side of the D.C. source is connected to the central point 27 where the resistors 23, 25 and 26 come together. A rectifier 36 and load resistor 37 are connected in series across the D.C. lines, one point of connection being between the resistor 34 and the point 35, and the other point of connection being between the D.C. source and point 27.

It will be noted that the rectifiers 28, 29, 30 and 31 are all poled alike with respect to their points of connection with the resistors 25 and 26. Thus, in the circuit shown in Figure 1, the positive side of the D.C. source is connected to the anodes of the rectifiers 30 and 31 so that current can flow toward points 32 and 33. Similarly, the rectifiers 28 and 29 are poled so that current can flow through them toward points 32 and 33. Obviously, the polarity of all the rectifiers could be reversed and the polarity of the D.C. supply reversed without changing the principle of operation.

Analysis of the bridge circuit shows that whenever the instantaneous values of the voltages supplied to the bridge circuit by the secondaries 20 and 21 differ (by an amount that is determined by the value of the components) during the time that the output of at least one of the secondaries is positive with respect to the rectifier associated with it, then at least one of the rectifiers 30 and 31 can conduct and provide a relatively low resistance path from the point 35 to the point 27 through one or the other of the rectifiers 30 or 31 and one or the other of the resistors 25 or 26. For example, if the voltage of secondary 21 is instantaneously greater than the voltage of secondary 20, then rectifiers 28 and 31 block but rectifier 30 remains conductive. On the other hand, if the voltage of secondary 21 is instantaneously less than the voltage of secondary 20, then rectifiers 29 and 30 block while rectifier 31 remains conductive.

With either rectifier 30 or 31 conductive, the voltage drop across the load resistor 37 remains very small because the value of voltage dropping resistor 34 is selected to be much greater than the value of resistors 25 and 26, and when either rectifier is conductive resistor 34 absorbs most of the D.C. voltage because of the relatively large current flowing through it; in this mode of operation, rectifier 36 compensates for the forward voltage drop across rectifier 30 or rectifier 31, absorbing the voltage that might otherwise appear across the load resistor because of the forward drop across these rectifiers. If, however, the voltages of transformer secondaries 20 and 21 become substantially equal within the predetermined tolerance and above a predetermined minimum level, then rectifiers 30 and 31 both block, the current flowing through resistor 34 becomes relatively small so that the voltage drop across it is also relatively small and the voltage drop across the load resistor 37 increases substantially, giving a signal which may be utilized, through conductors 38, to energize the coil 15 of contactor 10, either directly or through an amplifier, relay or the like, and connect the alternator 12 to the lines 14. The tolerance or voltage difference at which rectifiers 30 and 31 will both block is determined by the ratio between the resistance of resistors 25 and 26 and the resistance of resistor 23.

A practical circuit for connecting a three phase alternator to a three phase system is shown in Figure 2. In general, the principal components of the circuit for comparing the voltages of the alternator and the circuit to which it is to be connected are the same as those described heretofore, and the same reference characters have been employed for corresponding parts. Thus, transformers 18 and 19 are employed as before. However, the primary of transformer 18 is connected to one phase of the three phase system indicated by conductors 39, and the primary of transformer 19 is connected to that conductor 40 which carries the corresponding phase of the output of alternator 41. The primaries are connected together and to neutral or ground as shown, the alternator 41 and the system to which it is to be connected having a common neutral point. The contactor 10a controls all three phases of the output of the alternator 41; the contactor is actuated by a coil 15 as before.

The comparison circuit, as before, includes the secondaries 20 and 21 of the transformers 18 and 19, the resistor 23 connected to the point 24 at which the secondaries of the transformers 20 and 21 are connected together, the identical resistors 25 and 26, the rectifiers 28, 29, 30 and 31, the voltage dropping resistor 34, the rectifier 36 and load resistor 37. A manually operated switch 43 is provided which is closed when it is desired to place the system in operation.

The elements just recited operate in the same manner as described with respect to Figure 1 and produce a signal voltage across load resistor 37 when the voltages of secondaries 20 and 21 are instantaneously near enough to equal to each other so that rectifiers 30 and 31 both block. In this circuit, however, a condenser 44 is connected in parallel with resistor 37 with the result that the voltage drop across resistor 37 cannot build up to a value sufficiently great to give a signal to energize the coil 15 of the relay until the voltage of the alternator 41 has been close enough to the voltage of the system conductors 39 for a sufficient number of half cycles to charge the condenser sufficiently to permit the desired voltage to build up. Thus, with this arrangement, the alternator must be in substantial synchronism with the system to which it is to be connected; a mere momentary coincidence of one or two half cycles will not be sufficient to actuate the relay. In this circuit, the rectifier 36 not only compensates for the forward drop across rectifiers 30 and 31, but also prevents the capacitor 44 from discharging through the rectifiers 30 and 31 during negative half cycles.

In this circuit also, a transistorized amplifier is provided to give the power required for operation of the relay. The positive end of resistor 37 is connected to the base of a transistor 46 of the NPN type as shown. The collector of the transistor 46 is connected to the positive side of the D.C. supply through resistor 47, while the emitter is connected to the base of power transistor 48 which is connected across the D.C. source in series with the coil 49 of the paralleling relay 50 as shown. Energization of the relay 50 closes the D.C. circuit through conductors 51 and 52 to coil 15 of contactor 10a, thus closing the contactor and connecting the alternator 41 to buses 39.

With this circuit, when the alternator 41 has been in synchronism with the voltage in the buses 39 within the predetermined tolerances and for a sufficient period of time to charge the condenser 44, the preamplifier transistor 46 fires, causing the power transistor 48 to become conductive and energizing the coil 15 of relay 10a, thereby connecting the alternator 41 to the system.

The following components give satisfactory results in the circuit shown in Figure 2 in a 400 cycle, 3 phase, 115 volt system using 28 volts as the D.C. source.

Rectifiers 28 and 29—Transitron TL51
Rectifiers 30, 31 and 36—Transitron TJ5A
Resistor 23—1800 ohms, 10 watts
Resistor 34—18,000 ohms, ½ watt
Resistor 37—23,600 ohms, ½ watt
Resistor 47—2,750 ohms, ½ watt
Resistors 25 and 26—111 ohms, ½ watt
Condenser 44—5 microfarads Figure 3 of the drawings shows a further modification of the circuit in which a feed-back circuit is employed to make the circuit self-latching and thus eliminate any possibility of chattering of the automatic paralleling relay. The basic elements of the circuit are the same as those described in Figure 2, and similar elements have been given the same reference characters in Figure 3 as in Figure 2. In this circuit, however, the preamplifying transistor 46a is now of the PNP type, and resistor 54 and diode 55 have been added to provide a feed-back circuit from the circuit of the power transistor 48 so that once the transistors 46a and 48 have fired, they will remain conductive so long as the manual control switch 56 is closed.

In order to provide for adjustment of the maximum difference frequency for which the circuit will parallel the two systems, a variable resistor 57 is connected in series with the load resistor 37.

The change of the preamplifier transistor to one of the PNP type makes it necessary to reverse the polarity of all of the rectifiers in the circuit. Thus, the rectifiers 28a, 29a, 30a and 31a are all poled to conduct current in directions away from points 32 and 33, and the current limiting resistor 34a and diode 36a have been placed on the negative side of the D.C. system instead of the positive side as before. The principles of operation remain basically the same, however. The outputs of the secondaries 20 and 21 are compared in the bridge as before. With the manually operated switch 56 closed, when the generator has been in phase with the system voltage within the established tolerances and for the predetermined length of time as determined by the condenser 44, the preamplifier transistor 46a fires, causing the transistor 48 to conduct; this closes the automatic paralleling relay 50 and thereby energizes the coil 15 of contactor 10a. As long as the transistor 48 conducts, feed back through the circuit that includes resistor 54 and diode 55 maintains transistor 46a conductive and makes the entire circuit self-latching so that there is no likelihood of chattering of the paralleling relay 50.

The following components give satisfactory results in a system made according to Figure 3 and adapted for 400 cycle, 115 volt operation with a 28 volt D.C. supply:

Transistor 46a—Raytheon CK790
Transistor 48—Texas Instrument Company No. 970
Resistors 25 and 26—1800 ohms, ½ watt
Resistor 23—17,000 ohms, 2 watts
Resistor 34a—150,000 ohms, ½ watt
Resistor 37—5,000 ohms, ¼ watt
Resistor 57—2,000 ohms, adjustable ¼ watt
Resistor 58—1,500 ohms, ½ watt
Resistor 54—680 ohms, ½ watt
Condenser 44—0.7 microfarad
Rectifiers 28a and 29a—Transitron TL51
Rectifiers 30a, 31a and 36a—Transitron TJ5A Those skilled in the art will appreciate that the invention described herein provides for accurate and reliable energization of an automatic paralleling relay for connecting an alternator in synchronism to another alternating current circuit in which only static elements of proven reliability are employed with the exception of the automatic paralleling relay itself. The components are light in weight, the circuits are substantially unaffected by temperature variations, and the circuits operate reliably regardless of variations in A.C. voltage or D.C. control voltage within reasonable limits. The circuit can be accommodated to various design requirements by selection of the proper components; the circuit is sensitive and yet reliable and will not close the main contactor except after the synchronism within the established tolerance for the required period of time has been accomplished.

Various changes and modifications can be made in the forms of the invention described herein by way of example. The essential features of the invention are defined in the appended claims.

I claim:

1. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in a bridge circuit for comparing the instantaneous voltages of said sources, connections from a D.C. source to said bridge circuit, said bridge circuit having means for changing the impedance presented to said D.C. source from one value when the voltages of said A.C. sources are instantaneously substantially equal to a substantially different value when the instantaneous voltages of said A.C. sources differ by a predetermined amount, and means connected to said D.C. input and responsive to said changes in impedance for connecting said alternator to said other alternating current supply when the instantaneous voltages of said A.C. sources have been substantially equal for a predetermined length of time.

2. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in a bridge circuit for comparing the instantaneous voltages of said sources, a D.C. input to said bridge circuit, said bridge circuit having means providing a path of relatively high impedance to said D.C. input when the voltages of said A.C. sources are instantaneously substantially equal and a low impedance path to said D.C. input when the instantaneous voltages of said A.C. sources differ by a predetermined amount, a load resistor connected across said D.C. input whereby a signal voltage is developed across said load resistor when the impedance of said bridge to said D.C. input is relatively high, a condenser connected in parallel with said load resistor, and means controlled by the voltage drop across said load resistor for connecting said alternator to said other alternating current supply.

3. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in a bridge circuit for comparing the instantaneous voltages of said sources, a D.C. input to said bridge circuit, said bridge circuit having means providing a path of relatively high impedance to said D.C. input when the voltages of said A.C. sources are instantaneously substantially equal and a low impedance path to said D.C. input when the instantaneous voltages of said A.C. sources differ by a predetermined amount, a load resistor and a rectifier connected in series across said D.C. input whereby a signal voltage is developed across said load resistor when the impedance of said bridge to said D.C. input is relatively high, a condenser connected in parallel with said load resistor, and means including a preamplifier transistor controlled by the voltage drop across said load resistor, a power transistor controlled by said preamplifier transistor and a feed-back circuit to maintain said preamplifier transistor conducting so long as said power transistor is conducting for connecting said alternator to said other alternating current supply.

4. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in a bridge circuit for comparing the instantaneous voltages of said sources, a D.C. input to said bridge circuit, said bridge circuit having means providing a path of relatively high impedance to said D.C. input when the voltages of said A.C. sources are instantaneously substantially equal and a low impedance path to said D.C. input when the instantaneous voltages of said A.C. sources differ by a predetermined amount, a load resistor connected across said D.C. input whereby a signal voltage is developed across said load resistor when the impedance of said bridge to said D.C. input is relatively high, a condenser connected in parallel with said load resistor, and means including a preamplifier transistor controlled by the voltage drop across said load resistor, and a power transistor controlled by said preamplifier transistor for connecting said alternator to said other alternating current supply.

5. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in series in a bridge circuit for comparing the instantaneous voltages of said sources, connections from a D.C. source to said bridge circuit, said bridge circuit comprising a pair of rectifiers connected to one side of said D.C. source and circuit means whereby both of said rectifiers block and provide a path of relatively high impedance to said D.C. source when the voltages of said A.C. source are instantaneously substantially equal, at least one of said rectifiers providing a path of relatively low resistance when the instantaneous voltages of said A.C. sources differ by a predetermined amount, and means responsive to said changes in impedance for connecting said alternator to said other alternating current supply.

6. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in series in a bridge circuit for comparing the instantaneous voltages of said sources, connections from a D.C. source to said bridge circuit, said bridge circuit comprising a pair of rectifiers connected to one side of said D.C. source and circuit means whereby both of said rectifiers block and provide a path of relatively high impedance to said D.C. source when the voltages of said A.C. source are instantaneously substantially equal, at least one of said rectifiers providing a path of relatively low resistance when the instantaneous voltages of said A.C. sources differ by a predetermined amount, a rectifier and a load resistor connected in series across said D.C. connections, and means controlled by the voltage drop across said load resistor for connecting said alternator to said other alternating current supply.

7. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said sources being connected in series in a bridge circuit for comparing the instantaneous voltages of said sources, connections from a D.C. source to said bridge circuit, said bridge circuit comprising a pair of rectifiers connected to one side of said D.C. source and circuit means whereby both of said rectifiers block and provide a path of relatively high impedance to said D.C. source when the voltages of said A.C. source are instantaneously substantially equal, at least one of said rectifiers providing a path of relatively low resistance when the instantaneous voltages of said A.C. sources differ by a predetermined amount, a rectifier and a load resistor connected in series across said D.C. connections, a condenser connected in parallel with said load resistor, a voltage dropping resistor in one of said D.C. connections between said D.C. source and the point of connection of said series-connected rectifier and resistor thereto, and means including a preamplifier transistor controlled by the voltage drop across said load resistor, a power transistor controlled by said preamplifier transistor and a feed-back circuit to maintain said preamplifier transistor conducting so long as said power transistor is conducting for connecting said alternator to said other alternating current supply.

8. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, one terminal of each source being connected to a terminal of the other source in a bridge circuit for comparing the instantaneous voltages of said sources, said bridge circuit comprising a first resistor having one end connected to the point of connection of said sources to each other, a first pair of rectifiers, one rectifier of said pair being connected to the other terminal of one of said sources, the other rectifier of said pair being connected to the other terminal of the other of said sources, a pair of resistors, one resistor of said pair being connected between one of said rectifiers of said first pair and the other end of said first resistor, the other resistor of said pair being connected between the other of said rectifiers of said first pair and said other end of said first resistor, a second pair of rectifiers having connections to a common point, one of said rectifiers of said second pair being connected to a point between one of said rectifiers of said first pair and the resistor to which it is connected, the other rectifier of said second pair being connected to a point between the other of said rectifiers of said first pair and the resistor to which it is connected, all four of said rectifiers being poled alike with respect to said points, a connection from one side of a source of D.C. to the common point of connection of said first resistor and said pair of resistors and a connection from the other side of said source to the common point of connection between said rectifiers of said second pair, a rectifier and a load resistor connected in series across said D.C. connections, a voltage dropping resistor in one of said D.C. connections between said D.C. source and the point of connection of said series-connected rectifier and resistor thereto, and means controlled by the voltage drop across said load resistor for connecting said alternator to said other alternating current supply.

9. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, one terminal of each source being connected to a terminal of the other source in a bridge circuit for comparing the instantaneous voltages of said sources, said bridge circuit comprising a first resistor having one end connected to the point of connection of said sources to each other, a first pair of rectifiers, one rectifier of said pair being connected to the other terminal of one of said sources, the other rectifier of said pair being connected to the other terminal of the other of said sources, a pair of resistors, one resistor of said pair being connected between one of said rectifiers of said first pair and the other end of said first resistor, the other resistor of said pair being connected between the other of said rectifiers of said first pair and said other end of said first resistor, a second pair of rectifiers having connections to a common point, one of said rectifiers of said second pair being connected to a point between one of said rectifiers of said first pair and the resistor to which it is connected, the other rectifier of said second pair being connected to a point between the other of said rectifiers of said first pair and the resistor to which it is connected, all four of said rectifiers being poled alike with respect to said points, a connection from one side of a source of D.C. to the common point of connection of said first resistor and said pair of resistors and a connection from the other side of said source to the common point of connection between said rectifiers of said second pair, a rectifier and a load resistor connected in series across said D.C. connections, a condenser connected in parallel with said load resistor, a voltage dropping resistor in one of said D.C. connections between said D.C. source and the point of connection of said series-connected rectifier and resistor thereto, and means controlled by the voltage drop across said load resistor for connecting said alternator to said other alternating current supply.

10. A system for automatically connecting an alternator to another alternating current supply comprising a source of alternating current corresponding in frequency and voltage to the frequency and voltage of a phase of said alternator, another source of alternating current corresponding in frequency and voltage to a phase of said other supply, said one terminal of each source being connected to a terminal of the other source in a bridge circuit for comparing the instantaneous voltages of said sources, said bridge circuit comprising a first resistor having one end connected to the point of connection of said sources to each other, a first pair of rectifiers, one rectifier of said pair being connected to the other terminal of one of said sources, the other rectifier of said pair being connected to the other terminal of the other of said sources, a pair of resistors, one resistor of said pair being connected between one of said rectifiers of said first pair and the other end of said first resistor, the other resistor of said pair being connected between the other of said rectifier of said first pair and said other end of said first resistor, a second pair of rectifiers having connections to a common point, one of said rectifiers of said second pair being connected to a point between one of said rectifiers of said first pair and the resistor to which it is connected, the other rectifier of said second pair being connected to a point between the other of said rectifiers of said first pair and the resistor to which it is connected, all four of said rectifiers being poled alike with respect to said points, a connection from one side of a source of D.C. to the common point of connection of said first resistor and said pair of resistors and a connection from the other side of said source to the common point of connection between said rectifiers of said second pair, a rectifier and a load resistor connected in series across said D.C. connections, a condenser connected in parallel with said load resistor, a voltage dropping resistor in one of said D.C. connections between said D.C. source and the point of connection of said series-connected rectifier and resistor thereto, and means including a preamplifier transistor controlled by the voltage drop across said load resistor, a power transistor controlled by said preamplifier transistor and a feed-back circuit to maintain said preamplifier transistor conducting so long as said power transistor is conducting for connecting said alternator to said other alternating current supply.

References Cited in the file of this patent

UNITED STATES PATENTS 2,777,075    Moynihan _____ Jan. 8, 1957
2,817,024    Karlicek _____ Dec. 17, 1957